United States Patent [19]
Uchikoga et al.

[11] Patent Number: 5,552,800
[45] Date of Patent: Sep. 3, 1996

[54] COLOR DISPLAY CONTROL APPARATUS FOR CONTROLLING DISPLAY GRAY SCALE OF EACH SCANNING FRAME OR EACH PLURALITY OF DOTS

[75] Inventors: Hiroshi Uchikoga; Hiroki Zenda; Hajime Shimamoto, all of Tokyo, Japan

[73] Assignee: Kabushiki Kaisha Toshiba, Kawasaki, Japan

[21] Appl. No.: 294,614

[22] Filed: Aug. 23, 1994

Related U.S. Application Data

[63] Continuation of Ser. No. 740,168, Aug. 5, 1991, abandoned.

[30] Foreign Application Priority Data

Aug. 9, 1990 [JP] Japan ..................... 2-209341
Jul. 22, 1991 [JP] Japan ..................... 3-180763

[51] Int. Cl.$^6$ ............................. G09G 3/36; G09G 5/10; G09G 5/02
[52] U.S. Cl. ........................ 345/89; 345/149; 345/152
[58] Field of Search ........................ 345/1, 3, 88, 89, 345/98, 147–155

[56] References Cited

U.S. PATENT DOCUMENTS

| | | | |
|---|---|---|---|
| 4,760,387 | 7/1988 | Ishii et al. ........................ | 340/717 |
| 4,779,083 | 10/1988 | Ishii et al. . | |
| 4,827,255 | 5/1989 | Ishii ................................ | 340/793 |
| 4,921,334 | 5/1990 | Akodes . | |
| 5,059,962 | 10/1991 | Sekiya et al. .................... | 340/793 |
| 5,059,963 | 10/1991 | Fukuoka ........................ | 340/793 |
| 5,122,783 | 6/1992 | Bassetti, Jr. .................... | 340/793 |
| 5,155,478 | 10/1992 | Sekiya et al. .................... | 340/793 |
| 5,222,212 | 6/1993 | Johary et al. ...................... | 345/3 |
| 5,266,940 | 11/1993 | Shiraishi ........................ | 345/148 |

FOREIGN PATENT DOCUMENTS

| | | |
|---|---|---|
| 359236A3 | 3/1990 | European Pat. Off. . |
| 2637407 | 9/1988 | France . |
| 63-97921 | 4/1988 | Japan . |
| 2217080 | 10/1989 | United Kingdom . |

OTHER PUBLICATIONS

PVGA1A Paradise Video Graphics Array (manual), Western Digital Imaging/Paradise Systems, Dec. 9, 1988.

*Primary Examiner*—Steven Saras
*Attorney, Agent, or Firm*—Finnegan, Henderson, Farabow, Garrett & Dunner, L.L.P.

[57] ABSTRACT

According to this invention, a panel controller converts display data having 64 gray scale levels for a color CRT output from an RAMDAC into display data having 57 gray scale levels to perform display driving of a color LCD. The panel display controller has a function of generating 7 intermediate pseudo gray scales between the base frames of R, G, and B signals by a frame rate control method in the color LCD having 8 base gray scale levels of each of the R, G, and B signals to generate (180K colors) display data having 57 gray scale levels and a function of generating 3 intermediate pseudo gray scales between the base gray scales of the signals by a dither method to generate (24K colors) display data having 39 gray scale levels. The selection of the frame rate control or the dither method and the selection of the 512-color, 180-K-color, or 24-K-color display are arbitrarily performed, or these selection operations are automatically performed in accordance with a display mode.

15 Claims, 14 Drawing Sheets

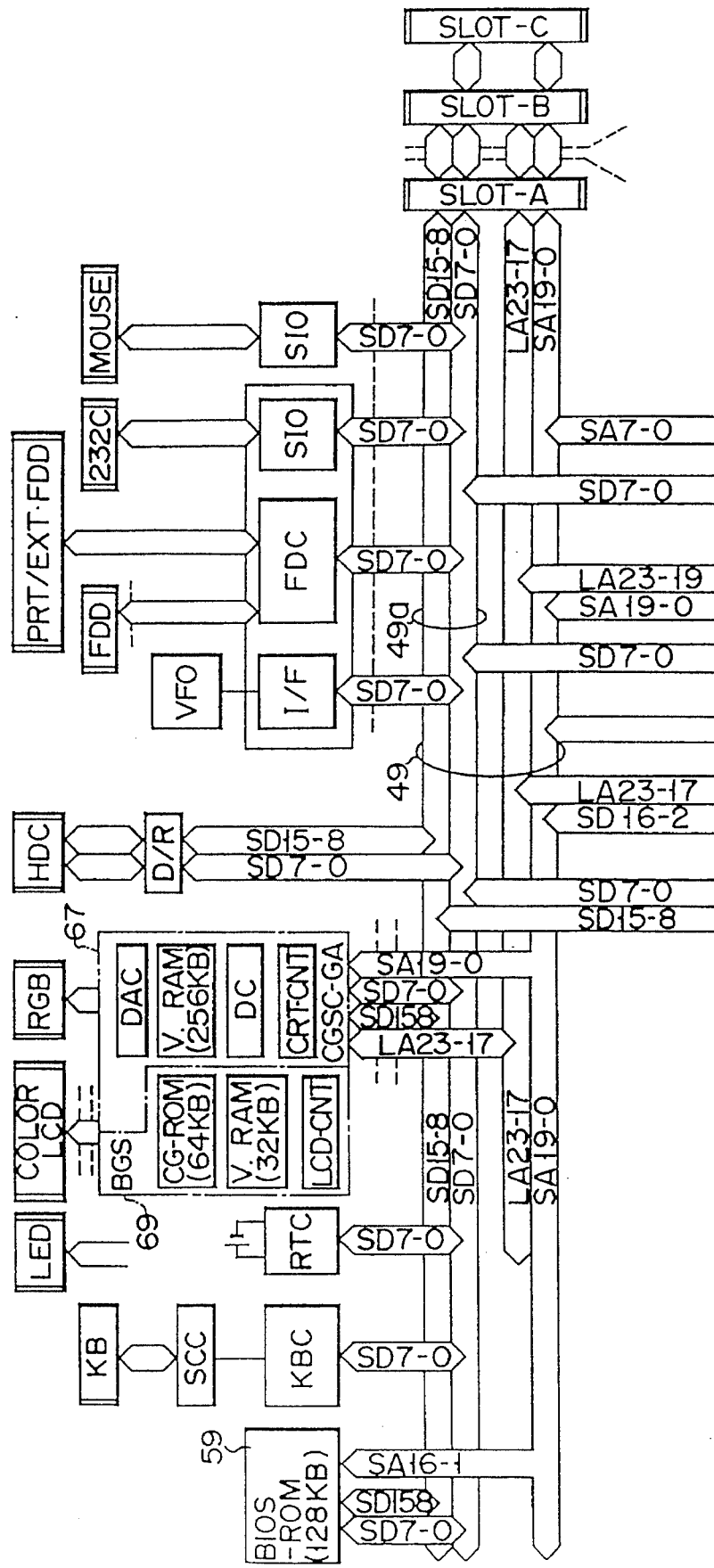
F I G. 2A

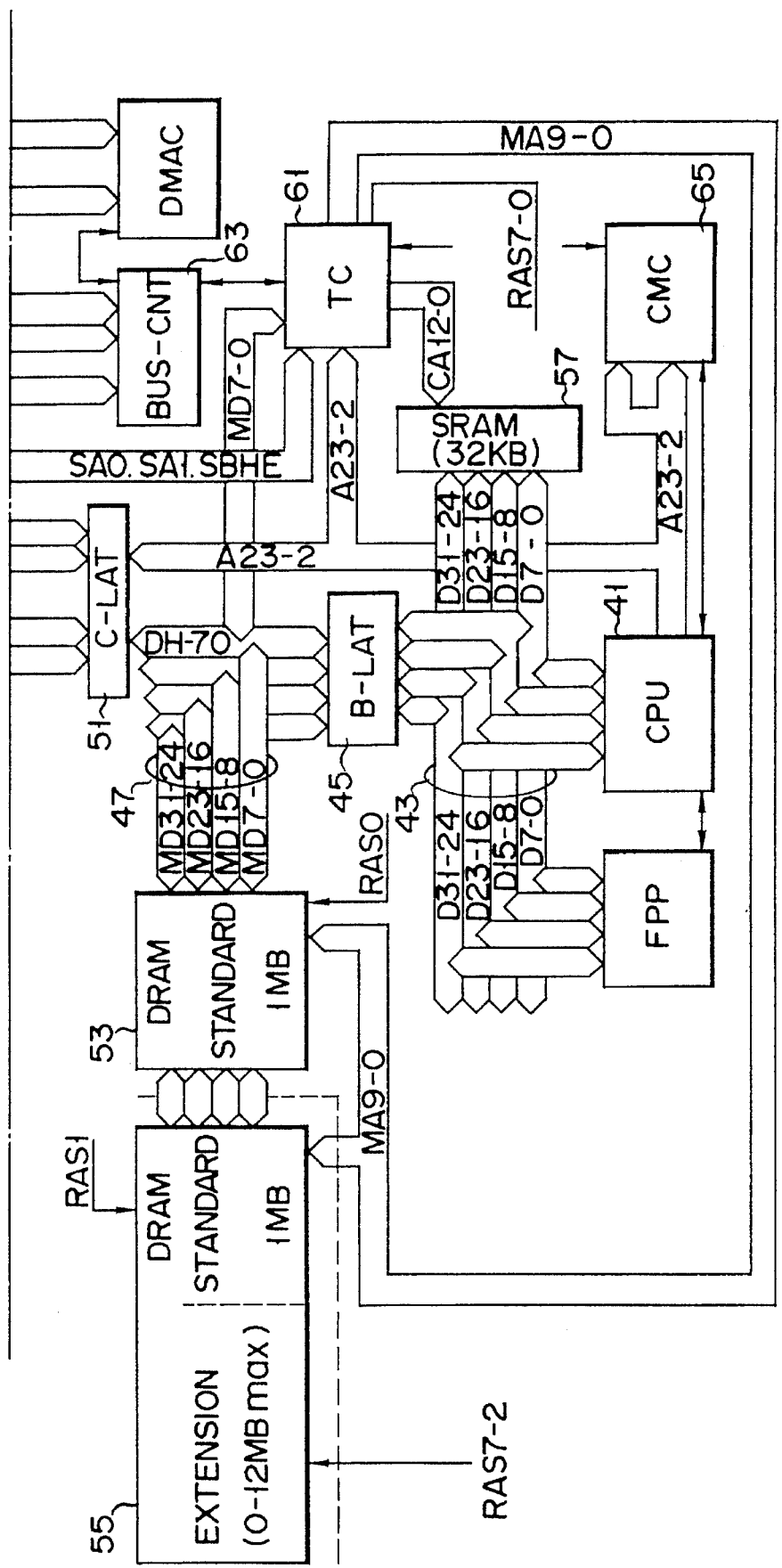
F I G. 2B 0 0 0   7   1/8   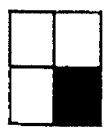
0 0 1   6   2/8   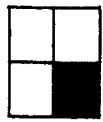   } FIRST INTERMEDIATE GRAY SCALE
0 1 0   5   3/8   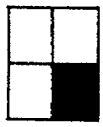
0 1 1   4   4/8   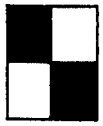   } SECOND INTERMEDIATE GRAY SCALE
1 0 0   3   5/8   
1 0 1   2   6/8      } THIRD INTERMEDIATE GRAY SCALE
1 1 0   1   7/8   
1 1 1   0   8/8   
RPA6-4 RBR GRAY SCALE
FIG. 6

| RAMDAC OUTPUT = CRT DISPLAY GRAY SCALE LEVEL | LCD GRAY SCALE LEVEL | RAMDAC OUTPUT = CRT DISPLAY GRAY SCALE LEVEL | LCD GRAY SCALE LEVEL |
|---|---|---|---|
| 0 | 0 (BLACK) | 32 | 28 |
| 1 | 1 | 33 | 29 |
| 2 | 2 | 34 | 30 |
| 3 | 3 | 35 | 31 |
| 4 | 4 | 36 | 32 |
| 5 | 5 | 37 | 33 |
| 6 | 6 | 38 | 34 |
| 7 | 7 | 39 | 35 |
| 8 | 8 | 40 | 35 |
| 9 | 9 | 41 | 36 |
| 10 | 10 | 42 | 37 |
| 11 | 11 | 43 | 38 |
| 12 | 12 | 44 | 39 |
| 13 | 13 | 45 | 40 |
| 14 | 14 | 46 | 41 |
| 15 | 14 | 47 | 42 |
| 16 | 15 | 48 | 42 |
| 17 | 16 | 49 | 43 |
| 18 | 17 | 50 | 44 |
| 19 | 18 | 51 | 45 |
| 20 | 19 | 52 | 46 |
| 21 | 20 | 53 | 47 |
| 22 | 21 | 54 | 48 |
| 23 | 21 | 55 | 49 |
| 24 | 22 | 56 | 49 |
| 25 | 23 | 57 | 50 |
| 26 | 24 | 58 | 51 |
| 27 | 25 | 59 | 52 |
| 28 | 26 | 60 | 53 |
| 29 | 27 | 61 | 54 |
| 30 | 28 | 62 | 55 |
| 31 |  | 63 | 56 |

F I G. 7

|   | PA3 | PA0 |
|---|---|---|
| A | 0 | 0 |
| B | 0 | 1 |
| C | 1 | 0 |
| D | 1 | 1 |
(grid: A B / C D)
FIG. 9
|   |   | RPSELD |
|---|---|---|
|  | RBG | 0 |
|  | RNG | 1 |
FIG. 10

| | | | | | FRAME (PA2,1) | 0 | 1 | 2 | 3 |
|---|---|---|---|---|---|---|---|---|---|
| 0 | 0 | 0 | 7 | 1/8 | | | | | |
| 0 | 0 | 1 | 6 | 2/8 | | | | | |
| 0 | 1 | 0 | 5 | 3/8 | | | | | |
| 0 | 1 | 1 | 4 | 4/8 | | | | | |
| 1 | 0 | 0 | 3 | 5/8 | | | | | |
| 1 | 0 | 1 | 2 | 6/8 | | | | | |
| 1 | 1 | 0 | 1 | 7/8 | | | | | |
| 1 | 1 | 1 | 0 | 8/8 | | | | | |
| RPA6-4 | | | RBR | GRAY SCALE | | | | | |

F I G. 11

| SL2 | SL1 | DISPLAY MODE |
|---|---|---|
| 0 | 0 | 512 COLORS |
| 0 | 1 | 24K COLORS DITHER |
| 1 | 0 | 180K COLORS FRC 8 FRAMES |
| 1 | 1 | 180K COLORS FRC 4 FRAMES |

F I G. 12

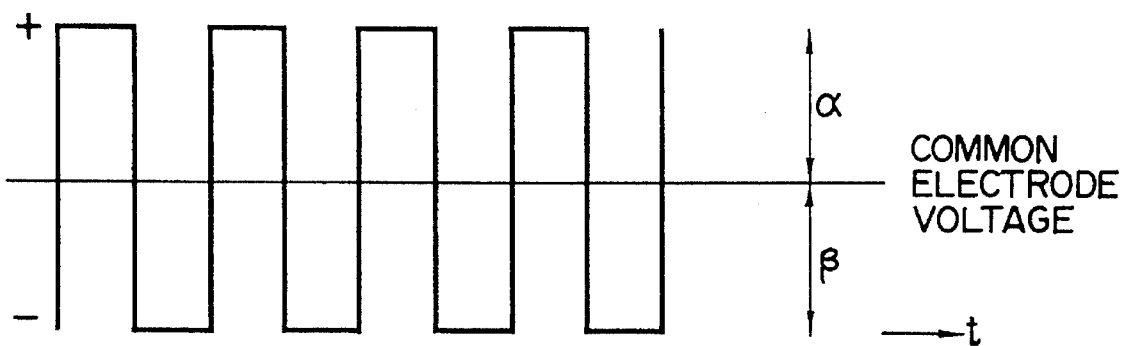
GRAY SCALE 7 (WHITE) TFT ON VOLTAGE MAX.
F I G. 13A
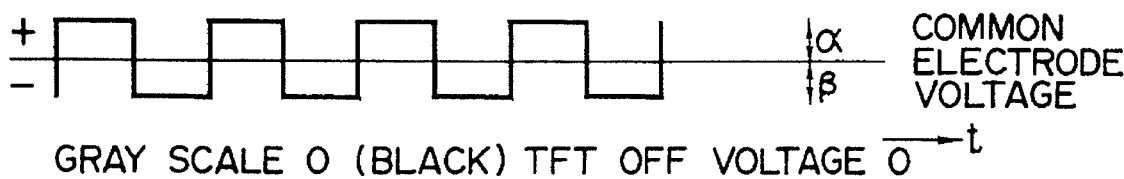
GRAY SCALE 0 (BLACK) TFT OFF VOLTAGE 0
F I G. 13B
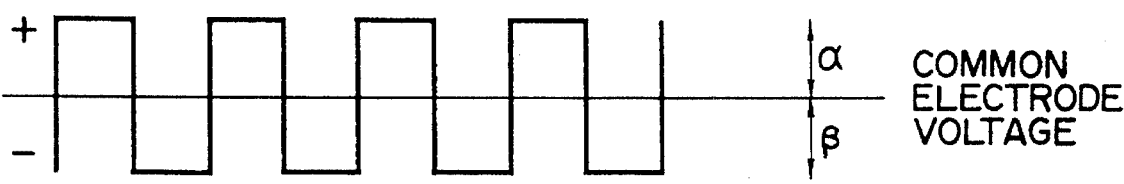
GRAY SCALE 3
F I G. 13C

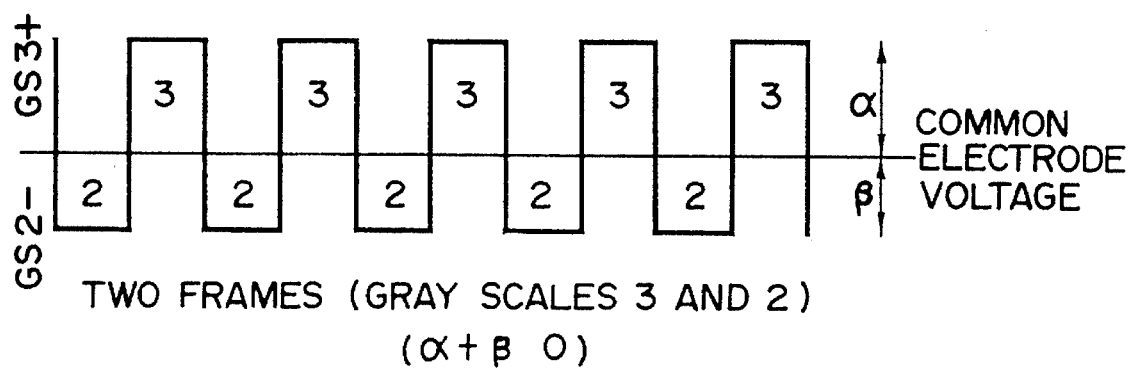
TWO FRAMES (GRAY SCALES 3 AND 2)
($\alpha + \beta$ 0)
F I G. 14
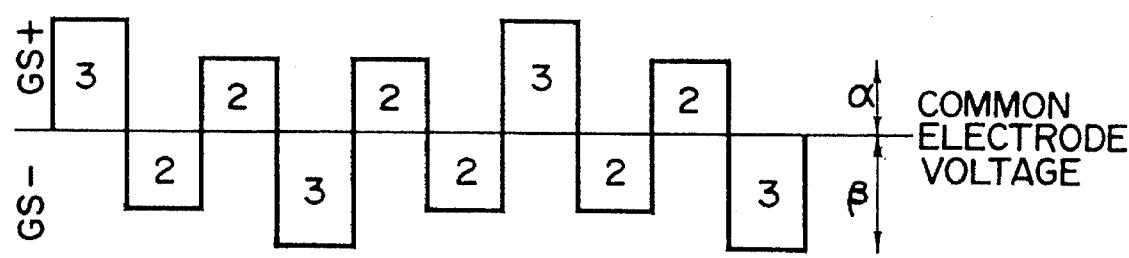
THREE FRAMES (GRAY SCALES 3 AND 2)
($\alpha + \beta = 0$)
F I G. 15

COLOR DISPLAY CONTROL APPARATUS FOR CONTROLLING DISPLAY GRAY SCALE OF EACH SCANNING FRAME OR EACH PLURALITY OF DOTS

This application is a continuation of application Ser. No. 07/740,168, filed Aug. 5, 1991, now abandoned.

BACKGROUND OF THE INVENTION

1. Field of the Invention

The present invention relates to a color liquid crystal display control system suitable for a laptop computer having a color liquid crystal display.

2. Description of the Related Art

As a conventional display monitor of a laptop computer, a flat-panel display such as a liquid crystal display (LCD) is used. A color CRT monitor can be connected to a laptop computer as an option. An arrangement of a color liquid crystal display control system in a laptop computer which has a color LCD as standard equipment and to which a color CRT display is connected as an option is shown in FIG. 1. In FIG. 1, a system bus 1 is constituted by an address bus having a 16-bit width and a data bus having a 16-bit width. Transfer of address and data is performed between a CPU 3 and each memory through the system bus 1. A video RAM (VRAM) 5 stores color display data displayed on a color CRT display 7 and a color LCD (liquid crystal display) 9. The VRAM 5 has a memory capacity of 64K×16 bits. The CPU 3 writes the display data in the VRAM 5 through a CRT controller 11 in response to a write command. The CRT controller 11 outputs the display data read out from the VRAM 5 to a display controller 15 and a display data generator (DAC) 17 through a display data bus 13 having a 8-bit width. The display data generator 17 converts the display data output from the CRT controller 11 into R, G, and B display data to output them to the color CRT display 7. A CRT palette 19 and a digital/analog convertor (not shown) are incorporated in the DAC 17. The color CRT display 7 is a display which can perform multi-color (256 colors of 256K (=262,144) colors) display at a high resolution (720×480 dots). The color CRT display 7 is synchronized with a horizontal sync signal (HSYNC) output from the CRT controller 11 and a vertical sync signal (VSYNC) 21 to display 18-bit RGB color display data from the analog output port of the DAC 17. The CRT palette 19 converts the display data output from the CRT controller 11 in designated colors. The display data converted by the CRT palette 19 in the designated colors is converted into R, G, and B analog display data by the DAC 17 to be output to the CRT display 7. The CRT display 7 displays a color image on the basis of the colors designated by the CRT palette 19. The display controller (DC) 15 is constituted by a gate array on which various functional circuits for controlling the display of the color LCD 9 and a bus interface function of transferring various display control data between the CPU 3 and the display controller 15 through the system bus 1 are mounted. In the arrangement shown in FIG. 1, when the palette data from the CRT palette 19 is updated, an arithmetic and logic section 23 calculates a gray-scale parameter having 39 gray scale levels from the data in accordance with a predetermined arithmetic expression. In addition, the arrangement includes a conversion table 25 for converting the 39-gray-scale parameter output from the arithmetic and logic section 23 into data having 16 gray scale levels and an LCD palette 27 in which the grayscale data generated from the conversion table 25 is set. The LCD palette 27 converts the display data output from the CRT controller 11 through the display data bus 13 into 4-bit R, G, B, and I data through the arithmetic and logic section 23 and conversion table 25 in the DC 15. The detailed description of the operation of the arithmetic and logic section 23 and conversion table 25 is disclosed in U.S. patent application Ser. No. 406,066 filed by the same assignee as that of the present invention. At this time, the LCD palette 27 is updated in accordance with updating of the CRT palette 19. The color LCD 9 is a color display capable of performing 16-color display. The color LCD 9 is synchronized with HSYNC and VSYNC signals 21 output from the CRT controller 11 to output 4-bit R, G, B, and I color display data from the digital port of the DC 15. A data bus 29 is a 16-bit bus for transferring various data including update palette data between the system bus 1 and the DC 15. A data bus 31 is a bus used for writing color designation data on the CRT palette 19 in the DAC 17. Each of address buses 33 and 35 is constituted by a bus having a 16-bit width. An address value from the CPU is input to the DC 15 and the CRT controller 11. The internal bus 37 is a bidirectional bus which transfers write data to the VRAM 5 and its address value between the DC 15 and the CRT controller 11. An address value designated by the CPU 3 through an address bus 39 having an 8-bit width is designated to the VRAM 5 by the CRT controller 11, and the CRT controller 11 reads out display data from VRAM 5 at a read timing.

The CRT display data sent from the CRT controller 11 to the DAC 17 is converted into 4-bit R, G, B, and I color data using the LCD palette 27 of the DC 15. For this reason, the number of colors displayed on the color LCD 9 is limited to the number of gray scales of the LCD palette 27. Therefore, when an application program made for, e.g., a color CRT is executed using the color LCD, it is desired that the designated 256 colors or less are further faithfully reproduced by the color LCD.

SUMMARY OF THE INVENTION

It is an object of the present invention to provide a color LCD display control system for generating intermediate gray scales by a frame rate control method and displaying display data set in a CRT palette on a color LCD.

It is another object of the present invention to provide a color LCD display control system for generating intermediate gray scales by a dither method and displaying display data set in a CRT palette on a color LCD.

It is still another object of the present invention to provide a color LCD display control system which has a function of generating intermediate gray scales by a frame rate control method and a dither method and can select any one of these methods.

It is still another object of the present invention to provide a color LCD display control system having a function of generating intermediate gray scales by any one of a frame rate control method and a dither method and a function of controlling a switching operation between 512 colors generated using base gray scales (R, G, and B signals each having 8 gray scale levels) and 185,193 colors generated using the intermediate gray scales.

According to the first aspect of the present invention, a color panel display control system comprises a color panel display device having a predetermined number of gray scale levels; a CRT controller for outputting display data and a display timing signal; and color panel display control means for receiving the display data from the CRT controller, displaying dots in an original display gray scale of the color panel display device on one scanning frame, changing display gray scales of the dots every scanning frame to represent intermediate gray scales of the predetermined number of gray scale levels for each plurality of scanning frames, thereby displaying the display data on the color panel display device.

According to the second aspect of the present invention, a color panel display control system comprises: a color panel display device having a predetermined gray scale; a CRT controller for outputting display data and a display timing signal; and color panel display control means for receiving the display data from said CRT controller, dividing a frame into a predetermined number of matrices, and changing a display gray scale constituted by dots on the matrices to represent intermediate gray scales of the predetermined gray scale in units of matrices, thereby displaying the display data on said color panel display device.

According to the third aspect of the present invention, there is provided a color panel display control system which comprises: a color panel display device having a predetermined number of gray scale levels; a CRT controller for outputting display data and a display timing signal; color panel display control means having a first display control function of receiving the display data from the CRT controller, displaying dots in an original gray scale of the color panel display device on one scanning frame, and changing display gray scales of the dots every scanning frame to represent intermediate gray scales of the predetermined display gray scale for each plurality of scanning frames, thereby displaying the display data on the color panel display device, and a second display control function of receiving the display data from the CRT controller, dividing a frame into a predetermined number of matrices, and changing a display gray scale of dots on the matrices to represent intermediate gray scales of the predetermined gray scale in units of matrices, thereby displaying the display data on the color panel display device; and means for selecting one of the first display control function and the second display control function of the color panel display control means.

According to the fourth aspect of the present invention, there is provided a color panel display control system which comprises: a color panel display device having a predetermined gray scale; a CRT controller for outputting display data and a display timing signal; and color panel display control means having a first display control function of receiving the display data from the CRT controller, displaying dots in an original display gray scale of the color panel display device in one scanning frame, changing display gray scales of the dots every scanning frame, and representing intermediate gray scales of the predetermined display gray scale for each plurality of scanning frames, thereby displaying the display data on the color panel display device, and a second display control function of receiving the display data from the CRT controller, dividing a frame into a predetermined number of matrices, and changing display gray scales of the dots on the matrices to represent intermediate gray scales of the predetermined gray scale in units of matrices, thereby displaying the display data on the color panel display device, first generating means for generating a first number of display color data by the first number of predetermined gray scales, second generating means for generating a second number of display color data using the first display control function or the second display control function, and switching means for performing a switching operation between the first and second generating means.

According to the fifth aspect of the present invention, there is provided the color panel display control means including means for scanning a scanning frame odd-numbered times.

According to the present invention, display data output from a display controller is divided in units of scanning frames of a display section, or a display frame is divided in a matrix form so as to control a display gray scale in units of dots constituting the matrix, thereby generating intermediate gray scales. As a result, display colors in number larger than that of the original display colors can be displayed. Therefore, since color data designated by an application program made for a color CRT can be displayed on a color LCD using the intermediate gray scales, color display can be faithfully performed by the color LCD. In this case, since the intermediate gray scales can be generated by a frame rate control method and a dither method, flexibility of the intermediate gray scales can be improved. In addition, 512 colors generated using a base gray scale and 185,193 colors generated using the intermediate gray scales can be arbitrarily switched or can be automatically switched in accordance with the application program, thereby providing a highly flexible color LCD display control system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A and 2B are block diagrams showing a whole computer system to which the present invention is applied;

FIG. 6 shows matrix patterns, each constituted by four dots, for explaining a dither method for generating the intermediate gray scales in the first embodiment;

FIG. 7 is a correspondence table wherein display data having 64 gray scale levels of a color CRT are converted into display data having 57 gray scale levels of a color LCD;

FIG. 9 is a view for explaining a corresponding relationship between pattern addresses generated in FIG. 8 and dots constituting a matrix;

FIG. 10 is a view for explaining a corresponding relationship between selection data generated in FIG. 8, a base gray scale, and the next gray scale;

FIG. 11 is a view for explaining a corresponding relationship between patterns and intermediate gray scales when the patterns are changed in units of 4 frames in a frame rate control method;

FIG. 12 is a table for explaining a corresponding relationship between mode setting signals and display modes;

FIGS. 13A through 13C are graphs for explaining a corresponding relationship between gray scales and common voltages;

FIG. 14 is a graph showing a common voltage applied to a color LCD in a case wherein each of intermediate gray scales is represented by 2 frames;

FIG. 15 is a graph showing a common voltage applied to a color LCD in a case wherein each of intermediate gray scales is represented by 3 frames according to another embodiment of the present invention; and FIG. 16 is a view for explaining a corresponding relationship between intermediate gray scales and patterns in a case wherein each of intermediate gray scales is represented by 3 frames according to the embodiment of FIG. 15.

DETAILED DESCRIPTION OF THE PREFERRED EMBODIMENTS

Figure 1:
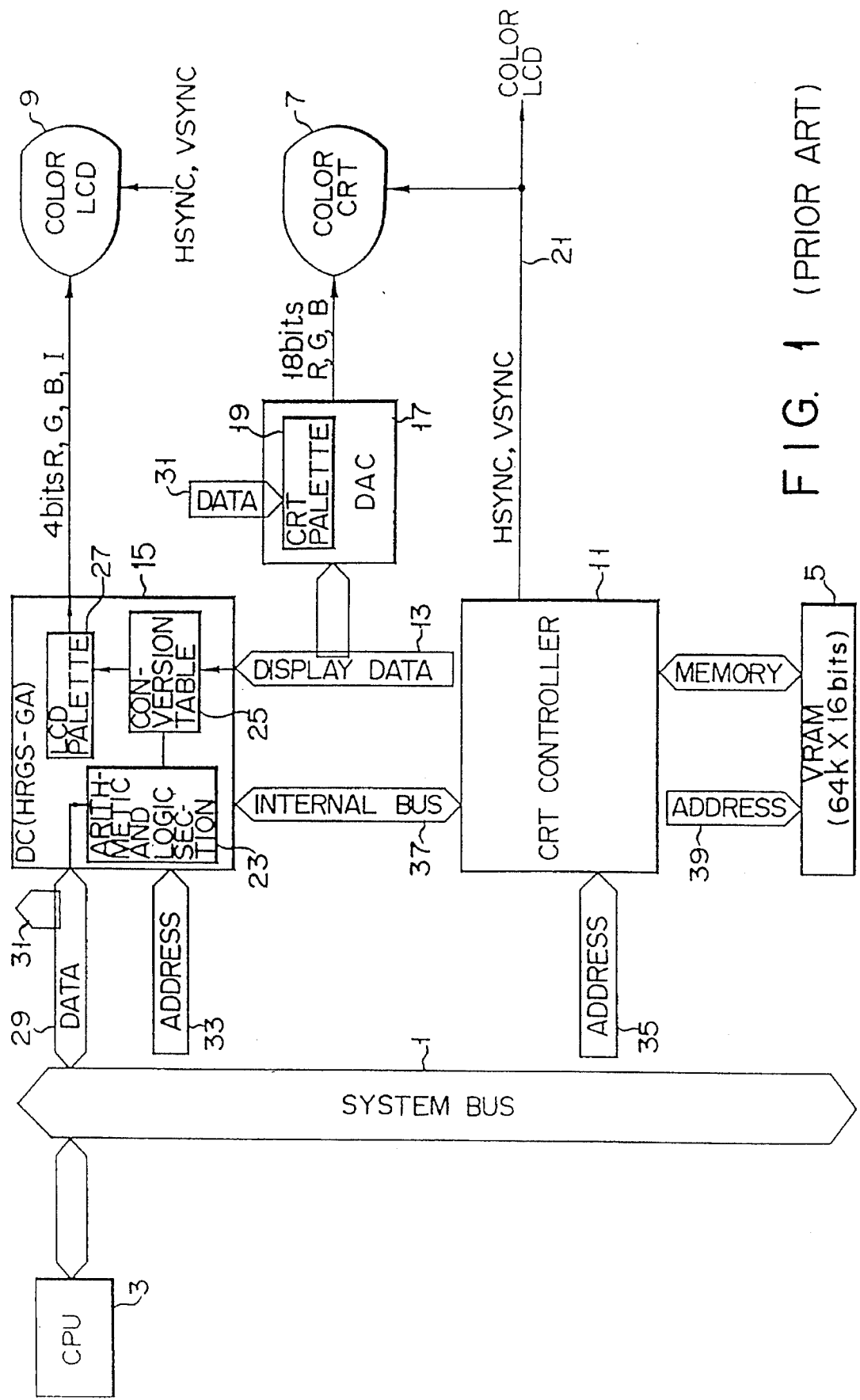
FIG. 1 is a block diagram showing a system arrangement of a conventional color liquid crystal display control apparatus.

An embodiment of the present invention will be described below with reference to FIGS. 2A through 11.

FIGS. 2A and 2B are block diagrams showing an embodiment of laptop personal computer system to which a color LCD display control system of the present invention is employed. In FIGS. 2A and 2B, an element 41 is a central processing unit (CPU) for controlling the whole system. An element 43 is a data bus (D31–D24, D23–D16, D15–D8, and D7–D0) having a 32-bit width. An element 45 is a latch circuit (B-LAT) for latching 10 data on the data bus 43. An element 47 is a memory bus (MD31–MD24, MD23–MD16, MD15–MD8, and MD7–MD0) having a 32-bit width. An element 49 is a system bus constituted by address buses (SA19–SA0 and LA23–LA17) respectively having 16- and 7-bit widths and a data bus (SD15–SD8 and SD7–SD0) 49a having a 16-bit width. An element 51 is a latch circuit (C-LAT) for latching address data on the address buses (SA19–SA0 and LA23–LA17) and data on the data bus (SD15–SD8 and SD7–SD0) 49a. Elements 53 and 55 are internal RAMs each of which is constituted a dynamic random access memory (DRAM) 6 and backed up by a battery (not shown). An element 57 is a cache memory, and an element 59 is an internal ROM (BIOS-ROM) for storing basic input and output system programs (BIOS). This BIOS-ROM 59 stores CRT display timing data set in a CRT controller (to be described later).

An element 61 is a timing controller (TC) for controlling timings of the whole system including memory control. An element 63 is a bus controller (BUS-CNT) for controlling the system bus 49. An element 65 is a cache memory controller (CMC) for controlling the cache memory 57.

An element 67 is a panel display controller (CGSC-GA: Color Gray Scale Control-Gate Array) having a display control function of performing display driving in a multi-gray-scale (64 gray scale levels), a display control function of performing display driving of a color LCD panel in 8 gray scale levels, i.e., a function of generating intermediate gray scales by a frame rate control method or a dither method and arbitrarily (for example, a user sets any one method during system setup) performing a switching operation between the frame rate control method and the dither method or automatically performing the switching operation in accordance with a display frame mode. A color CRT display is arbitrarily connected to the panel display controller 67 through a connector C1 (not shown). An element 69 is a display system (BGS) for performing display driving of the color LCD. The color LCD is connected to the display system 69 through a connector C2 (not shown). The color LCD is standard equipment and generally held to be connected to the connector C2.

Elements SL1 and SL2 are extension slots (SLOT-B and SLOT-C) capable of connecting various extension boards including a display adapter board.

Figure 3:
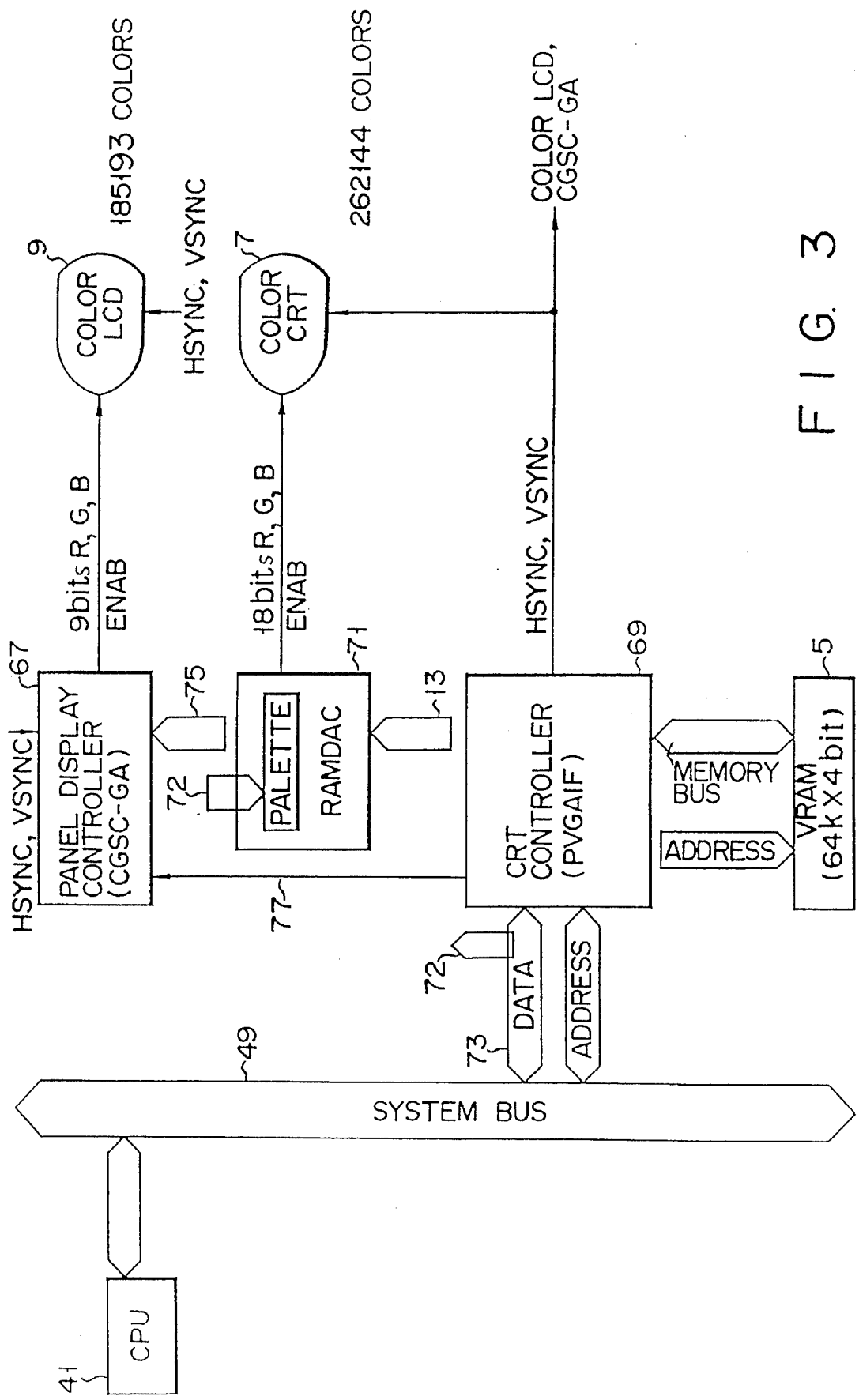
FIG. 3 is a block diagram showing a color liquid crystal display control system according to the first embodiment of the present invention.

FIG. 3 is a detailed block diagram showing the panel display controller (CGSC-GA) 67 shown in FIG. 2A.

In FIG. 3, for example, a PVGAlF manufactured by Paradise Corp., U.S.A. can be applied as the CRT controller 69. In the CRT controller 69, display data is read out from a VRAM 5 and output to a RAMDAC 71 through a display data bus 13 having an 8-bit width. The CRT controller 69 transfers various display control data between the CPU 41 and the CRT controller 69 through a data bus 73. The RAMDAC 71 converts the display data output from the CRT controller 69 into RGB LCD display data having 18 bits and outputs the data to the panel controller 67 through a display data bus 75. The panel display controller (CGSC-GA) 67 converts the display data into a gray scale. Only upper-three bits of each of the 6-bit R, G, and B display data output from the RAMDAC 71 are output to a color LCD 9 as significant display data. That is, a driver for converting the drain voltage of a TFT (Thin Film Transistor) color LCD into 8 levels is used in this embodiment. As a result, when no intermediate gray scale is generated, the 64 gray scale levels (262,144 colors) of the R, G, and B display data are inverted into 8 gray scale levels (512 colors). A mode setting signal 77 is constituted by an FRC frame count setting signal, a gray-scale display method setting signal, and the like. The FRC frame count setting signal is a setting signal for changing a gray-scale pattern in units of 4 or 8 frames. The gray-scale display method setting signal is a signal for setting a gray-scale display in the dither method or the FRC method. In addition to the above mode setting signals, horizontal/vertical sync signals, a display enable signal, and a display base clock signal are sent from the CRT controller 69 to the panel display controller 67. The color LCD 9 is a color display in which gray-scale control is performed by the panel display controller 67 and 185193 colors can be displayed.

With the above arrangement, a conventional CRT controller 11 and a conventional display controller 15 are constituted as a single device, and a device used for displaying only an intermediate gray scale is arranged. Therefore, the number of devices for controlling the display of the color LCD 9 can be reduced, and gray-scale display can be easily controlled.

Figure 4:
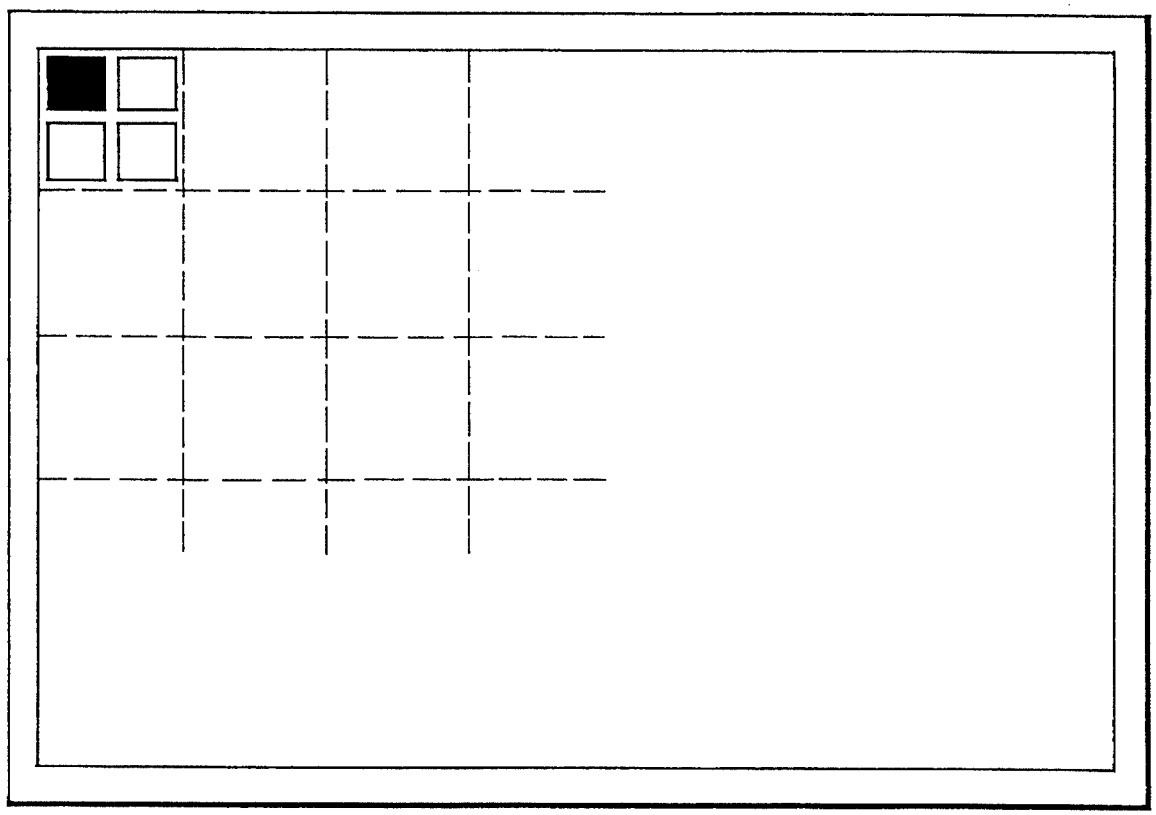
FIG. 4 is an enlarged view showing a display frame obtained by dividing a frame of the color LCD of the first embodiment into a matrix form.

FIG. 4 is an enlarged view showing a part of a display frame obtained by dividing the display frame of the color LCD 9 in a matrix form. Although one matrix consists of 4 dots in this embodiment, the present invention is not limited to this arrangement. The arrangement of the matrices is not only n×n, but n×m.

Figure 5:
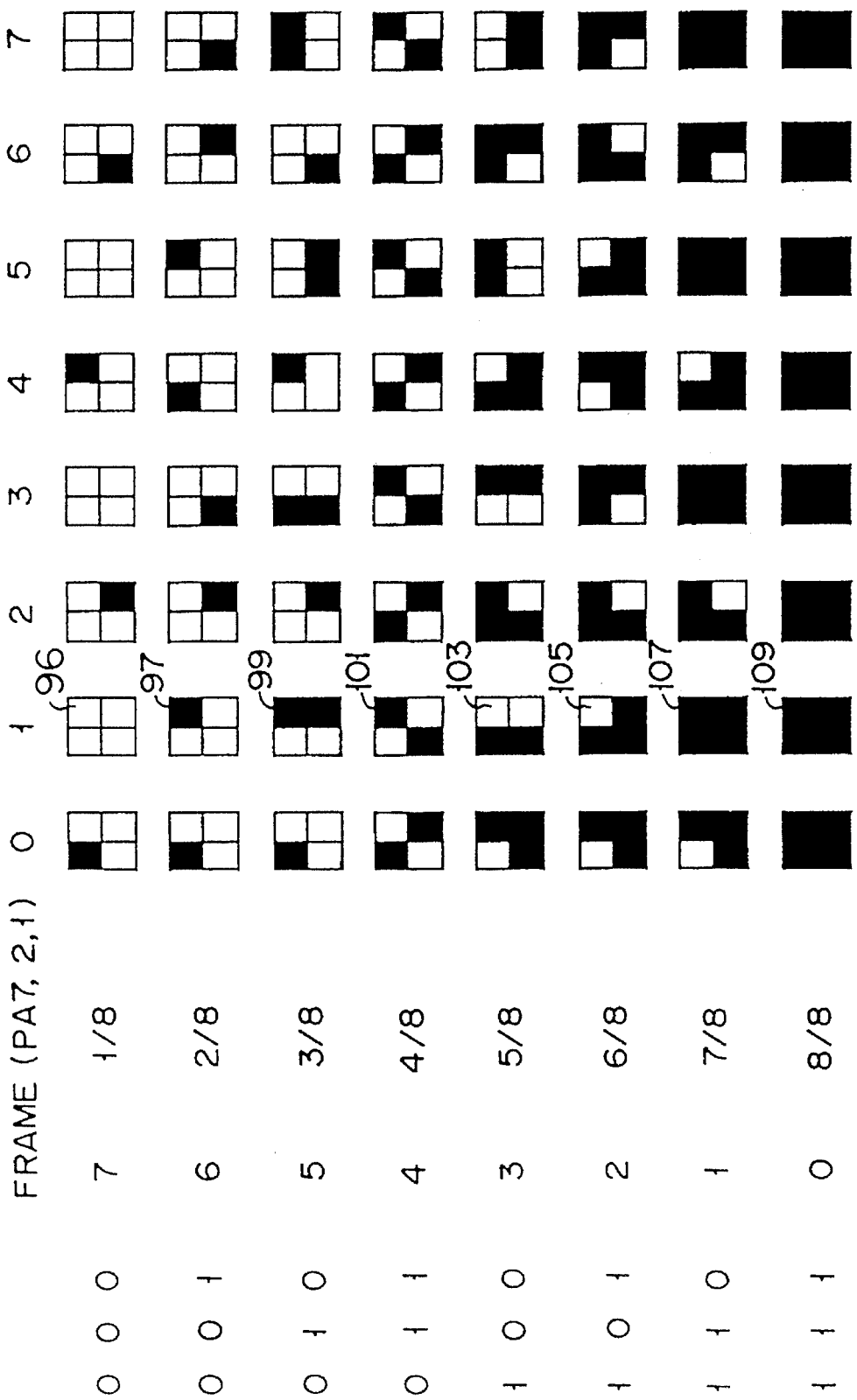
FIG. 5 shows matrix patterns, each having four dots, for explaining a frame rate control method for generating the intermediate gray scales in the first embodiment.

FIG. 5 is a table showing correspondence between intermediate gray scales and display patterns when pseudo intermediate gray scales are generated by the frame rate control method and the patterns are changed in units of 8 frames. In FIG. 5, a white dot represents a base gray scale, and a black dot represents the next gray scale of the base gray scale. Seven intermediate gray scales are produced as pseudo scales by mixing the next gray scale in the base gray scale. Note that a method of producing these patterns will be described later.

FIG. 6 is a table showing correspondence between intermediate gray scales and patterns when the seven intermediate gray scales are generated by the dither method, and the patterns are the same as the patterns of the frame 2 shown in FIG. 5. The present invention is not limited to these patterns. In the dither method, unlike the frame rate control method, display gray scales are not changed every scanning frame of the color CRT 7. Note that a method of generating the patterns corresponding to the intermediate gray scales will be described later.

FIG. 7 is a conversion table obtained when display data having 64 gray scale levels of the color CRT11 is inverted into a display data having 57 gray scale level of a color LCD. Each of R, G, and B data output from a CRT controller (FIG. 2A) is constituted by 6 bits, and each of the R, G, and B data has 64 gray scale levels. Each of R, G, and B data output to the color LCD is constituted by 3 bits, and each of the R, G, and B data has 8 base gray scale levels. In addition, in this embodiment, since 7 intermediate gray scale levels are generated between the 8 base gray scales, the total number of gray scales is 8+7×7=57. Therefore, when the 64 gray scale levels output from the RAMDAC 71 are converted into 57 gray scale levels by the panel display controller 67, the conversion is performed according to the conversion table shown in FIG. 7.

Figure 8:
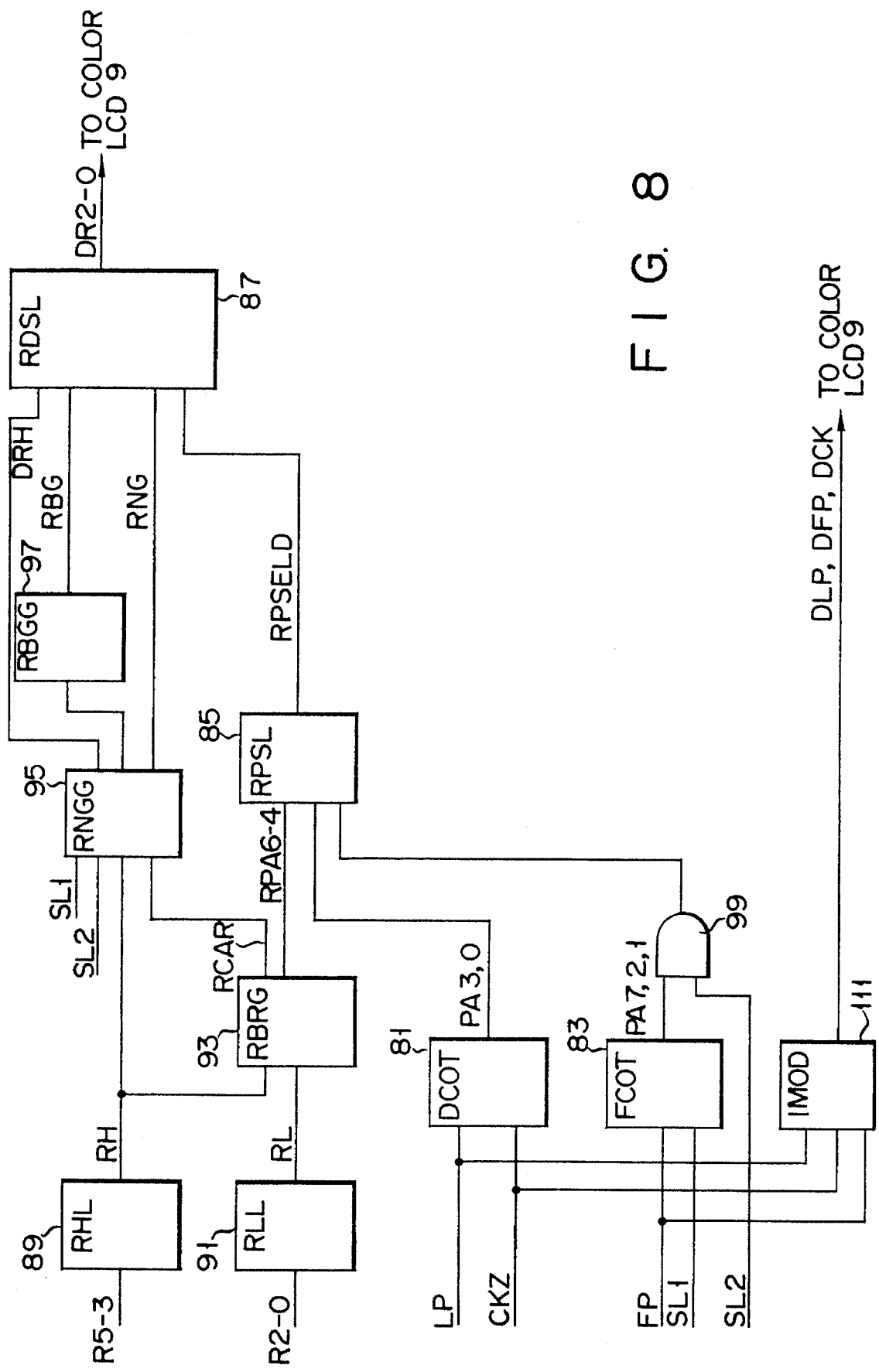
FIG. 8 is a detailed block diagram showing the panel display controller 67 shown in FIG. 3.

FIG. 8 is a detailed block diagram showing the panel display controller shown in FIG. 3.

The reference symbols used in FIG. 8 will be described as follows.
RHL: Red High data Latch
RLL: Red Low data Latch
RBRG: Red Base gray-scale Ratio data Generator
RNGG: Red Next Gray-scale data Generator
RBGG: Red Base Gray-scale data Generator
RPSL: Red Pattern SeLector
RDSL: Red Data SeLector
DCOT: Dot COunter
FCOT: Frame Counter
IMOD: Initial MOde Detector
RH: Red High data
RL: Red Low data
RCAR: Red CARry
RPA: Red Pattern Address
RNG: Red Next Gray-scale
RBG: Red Base Gray-scale
DRH: Delayed Red High data
PA: Pattern Address
RPSELD: Red Pattern SELect Data Although FIG. 8 is a block diagram wherein intermediate gray scale levels are produced for Red data, since the same block diagram as that for the Red data is used as block diagrams for Green and Blue data, only the block diagram for the Red data will be described below for descriptive convenience.

In FIG. 8, a dot counter (DCOT) 81 inputs a CRT horizontal blanking period signal or a display enable signal (LP) output from the CRT controller 69 and a CRT display fundamental clock signal (CKZ) to input a 2-bit pattern address signal (PA3 and PA0). As shown in FIG. 9, one dot of four dots constituting one matrix is addressed by the 2-bit signal. In addition, a frame counter (FCOT) 83 inputs a CRT vertical blanking period signal FP output from the CRT controller 69 to output a 3-bit pattern address signal (PA7, PA2, and PA1). That is, the 3-bit signal designates one of the ⅛ through ⅝ frames shown in FIG. 5. For example, when the dot indicated by reference numeral 96 in FIG. 5 is selected, three bits of a signal output from the FCOT 83 are set to be "0", "0", and "1", and two bits of a signal output from the DCOT 81 are set to be "0" and "1", respectively. The 2-bit signal from the DCOT 81 and the 3-bit signal from the FCOT 83 are input to the RPSL 85 through an AND gate 99. In addition, the RPSL 85 receives red pattern addresses RPA6–RPA4 to output red pattern select data (RPSELD). This RPSELD is supplied to a red data selector (RDSL) that is for selecting one of the RBG and RNG signals (described below).

A red high data latch (RHL) 89 latches upper three bits of 6-bit R data output from the RAMDAC 71 shown in FIG. 3 to output 3-bit red high data (RH). A red low data latch (RLL) 91 latches lower three bits of 6-bit R data output from the RAMDAC 71 to output 3-bit red low data (RL). A red base gray-scale ratio data generator (RBRG) 93 performs a predetermined calculation on the basis of the RH and RL data, generates the pattern addresses RPA6–RPA4 depending on color data to output it to the RPSL 85 and generates a red carry (RCAR) signal to output it to a red next gray-scale data generator (RNGG) 95. In addition, an FRC frame count setting signal SL1 and a gray-scale display method setting signal SL2 are applied to the RNGG 95. The RNGG 95 selects a display mode from 512-color, 18-K-color, or 24-K-color display modes by signals SL1 and SL2 (correspondence between these signals and the display modes is to be described later).

When the 512-color display is to be performed, the LCD 9 is driven in a base gray scale (8 gray scale levels). Therefore, a DRH signal is output to an RDSL 87.

In other display modes, the RNG signal which is one of the two gray-scale data sent to the color LCD 9 is generated by the RH and RCAR signals, and a red base gray-scale data generator (RBGG) 97 generates the red base gray-scale signal (RBG). Each of the RNG and RBG signals represents 0–7 gray scale levels (since each of the R, G, and B data is represented by 3 bits in this embodiment, each of the RNG and RBG signals has 8 gray scale levels), and the number of gray scale levels of the RBG signal is smaller than those of the RNG signal by one.

The RPA6–RPA4 signal selects one gray scale from the 8 gray scale levels. That is, as described above, although a frame and a dot thereof are selected by a signal having 2 bits PA3 and PA0 and a signal having 3 bits PA7, PA2, and PA1, since there are 8 gray scale levels constituted by a base gray scale and intermediate gray scales, the 8 dots are located at the same position in the same frame (in FIG. 5, reference numerals 96, 97, 99, 101, 103, 105, 107, and 109). One of the 8 gray scale levels is determined by the RPA6–RPA4 signal. When the 1-bit RPSELD signal output from the RPSL 85 is set to be "1", the RDSL 87 selects the RNG signal of a black dot, as shown in FIG. 10. When the RPSELD signal is set to be "0", the RDSL 87 outputs the RBG signal of a white dot. The RDSL 87 supplies the RNG or RBG signal to the color LCD 9 as a 3-bit R data (DR2–DR0) on the basis of the selection signal RPSELD signal. When the DRH signal is a significant signal, the RDSL 87 supplies a signal of 8 base gray scale levels to the color LCD 9 as R data. Note that an IMOD 111 generates an LCD horizontal blanking period signal, an LCD vertical blanking period signal (DFP), and an LCD display base clock signal (DCK) from the LP signal, the CKZ signal, and EP signal.

In the embodiment shown in FIG. 5, seven patterns for generating intermediate gray scales in units of 8 frames are changed by the frame rate control method. For example, since an 1/8 gray scale has 8 frames and one matrix is constituted by 4 dots, the dot pattern of the 1/8 gray scale is arranged such that of all the 32 dots, the number of RNG signals, i.e., the number of four next gray scales is 4 (4/32=1/8). Similarly, of the number of 32 dots, the 2/8 gray scale has 8 RNG signals (8/32= 2/8). All the 32 dots are the RNG signals in the 8/8 gray scale, and the 8/8 gray scale is equal to the next gray scale. For example, when a base gray scale and the next gray scale are set to be "3" and "4", respectively, a frame rate between the base gray scale "3" and the gray scale "4" is controlled, and seven pseudo intermediate gray scales such as a 3+1/8 gray scale, a 3+2/8 gray scale, a 3+3/8 gray scale, a 3+4/8 gray scale, a 3+5/8 gray scale, a 3+6/8 gray scale, and a 3+7/8 gray scale are produced. In this case, the color LCD is constituted by, e.g., a TFT (Thin Film Transistor), and voltages corresponding to 8 base gray scales can be applied to the color LCD, but a voltage corresponding to the 3+1/8 gray scale cannot be applied to the color LCD as described above. For this reason, when intermediate gray scales between the base gray scales 3 and 4 are used, a voltage corresponding to the base gray scale 3 is applied to the color LCD, and a voltage corresponding to the base gray scale 4 is properly applied to the color LCD in the 8 frames to generate a pseudo intermediate gray scale.

An FRC frame count setting signal SL1 is input to the FCOT 83. When the SL1 signal is set to be "low level", 8 frames are selected. When the SL1 signal is set to be "high level", a method of changing patterns in units of 4 frames is selected as shown in FIG. 1. A gray-scale permission setting signal SL2 is input to the RNGG 95. The RNGG 95 sets 512 colors when the SL2 is set to be "low level", and the RNGG 95 sets 185,193 colors when the SL2 is set to be "high level". When the 512 colors are set, the RNGG 95 outputs a DRH signal.

In the dither method, a scanning frame is divided into a plurality of matrices, and a display gray scale is changed every dot in the matrices. That is, until a color display data for performing display on the frame is changed, the dot display pattern of the same matrix is continuously displayed. As shown in FIG. 5, three intermediate gray scales can be represented by a matrix constituted by 4 dots. Since the three intermediate gray scales are generated between the 8 base gray scale levels, the number of gray scale levels of each of R, G, and B signals is 29. Therefore, the total number of display colors is 24,389. Although one matrix is constituted by 4 dots in this embodiment, the matrix may be constituted by an arbitrary number of dots to increase or decrease the total number of colors. When the dither method is selected, the slot SL2 is set to be "0" level. As a result, the AND gate 99 is closed, and a pattern address signal for selecting a frame is not supplied to the RPSL 85. Therefore, a specific frame is fixedly used.

When the frame rate control method is selected, the gray-scale display setting signal SL2 is set to be "high level". When the dither method is selected, the signal SL2 is set to be "low level".

When the frame rate control method is selected, since each of the R, G, and B signals has 57 gray scale levels, 185,193 colors can be displayed.

In this embodiment, gray-scale information of the R, G, and B display data is given in units of 3 bits. Therefore, a common voltage corresponding to 8 gray scale levels of each of the R, G, and B signals is applied to the TFT color LCD, and display of 8×8×8=512 colors can be performed.

The selection of the frame rate control method or the dither method and the selection of the 512-color display or the 185,193-color display are performed to be described below. For example, a menu used for selection of a user can be displayed in setup process accompanied with an ON operation of a computer system. In addition, in this embodiment, when VGA (Video Graphics Array) display having various display modes is to be performed, if a graphics display mode in which the maximum number of simultaneous display colors is 256K and the number of vertical and horizontal dots is 320×200, either the frame rate control method or the dither method can be used. When a display mode of other display modes requiring only 16 colors (or less) of the maximum 256K simultaneous display colors, it is determined that a display content is slightly influenced by the gray scale, and data can be satisfactorily represented by the 512-color display mode. For this reason, a color panel is automatically switched to an original display mode of the control panel. The above automatic control is performed as follows. For example, a parameter set from an application program in a register of the CRT controller 69 is detected, and a required mode setting signal is output to the panel display controller 67.

In this case, a correspondence between the mode setting signal supplied to the panel display controller 67 and display modes is shown in FIG. 12. As shown in FIG. 12, when the FRC frame count setting signal SL1 and the gray-scale display mode setting signal SL2 are set to be "0", the controller 67 performs display driving of the color LCD 9 in 512 colors. When the FRC frame count setting signal SL1 and the gray-scale display mode setting signal SL2 are set to be "0" and "1", respectively, the dither method is selected, and display driving of the LCD 9 is performed in 24K colors. When the signals SL1 and SL2 are set to be "1" and "0", respectively, the number of frames is set to be 8 by the FRC method, and the display driving of the LCD 9 is performed in 180 K colors. When both the signals SL1 and SL2 are set to be "1", the FRC method is selected, the number of frames is set to be 4, and the display driving of the LCD 9 is performed in 180K colors.

When the TFT color LCD is used, the color LCD is driven while the polarities of a common voltage are alternately inverted not to remain a DC component. In this case, when the LCD is driven by a common voltage corresponding to 8 base gray scale levels, an electrical sum of the common voltage components is set to be 0, and no problem is posed. When intermediate gray scales are displayed, as described above, the LCD is driven by a voltage corresponding to the next gray scale of the base gray scale with respect to a dot. In this case, when a pattern is changed in units of even-numbered frames, a DC component is applied to a liquid crystal to degrade it. In general, it is known that distortion occurs in a liquid crystal when a DC component is applied to a liquid crystal. For this reason, polarities of the voltage applied to the liquid crystal are inverted every predetermined period. FIGS. 13A through 13C show voltage components when viewed in units of dots. In FIGS. 13A through 13C, the polarities of the voltages are inverted every one frame. FIG. 13A shows a gray scale 7 (white), FIG. 13B shows a gray scale 0 (black), and FIG. 13C shows a gray scale 3 (intermediate color). In FIGS. 13A through 13C, since the gray scales are not periodically changed, a sum of the common electrode voltages is set to be 0 (if positive and negative voltages are represented by symbols $\alpha$ and $\beta$, respectively, then a $\alpha+\beta=0$).

As shown in FIG. 14, when a gray scale is changed every even-numbered frames (e.g., 2 frames), a common voltage corresponding to the gray scale 2 and a common voltage corresponding to the gray scale 3 alternately appear. Therefore, a sum of the common electrode voltages is not set to be 0, and a DC component remains.

Figure 16:
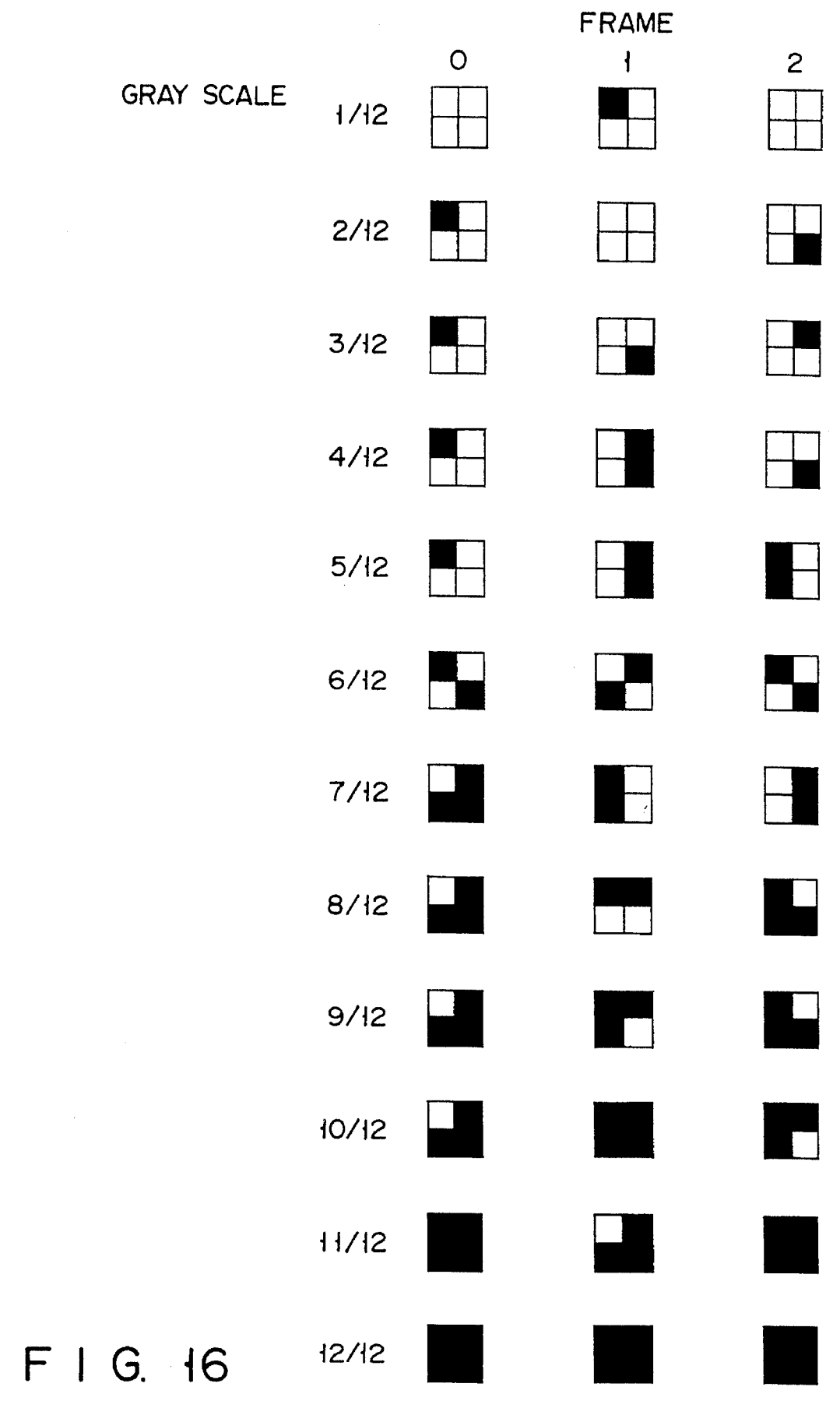

As shown in FIG. 15, it can be considered that the gray scales are changed every odd-numbered frames (e.g., 3 frames). That is, common voltages corresponding to the gray scales 2 and having opposite polarities are applied to the LCDs in two out of the 3 frames, and the common voltage of the gray scale 3 is applied to the LCD in the remaining frame. Since the common voltage of the gray scale 3 having a polarity opposite to that of the previous cycle is applied to the LCD in the next cycle, a sum of the voltages becomes 0, and no DC component is applied to a liquid crystal. When the 3 frames are used, since one next gray scale is assigned to 12 dots, 12 intermediate gray scale levels are generated. In this case, patterns corresponding to the intermediate gray scale levels are shown in FIG. 16.

Additional advantages and modifications will readily occur to those skilled in the art. Therefore, the invention in its broader aspects is not limited to the specific details, and representative devices shown and described. Accordingly, various modifications may be made without departing from the spirit or scope of the general inventive concept as defined by the appended claims and their equivalents.

What is claimed is:

1. A color panel display control system for a display screen having a plurality of dots, the column panel display control system comprising:

a color panel display device having a predetermined number of gray scale levels for each of specified primary colors;

a CRT controller for outputting display data representing the primary colors and display timing signals to control the color panel display device;

RAMDAC means for converting the display data output from the CRT controller into R-, G-, and B-data; and color panel display controller means having:

means for receiving the R-, G-, and B-data from the RAMDAC means, for generating each of R-, G-, and B-base gray-scale data and each of R-, G- and B-next gray-scale data from the received R-, G-, and B-data, wherein the R-, G-, and B-base gray-scale data and the R-, G- and B-next gray-scale data are predetermined by voltage levels associated with the dots of the display screen, and for generating a frame rate duty cycle from a vertical sync signal, dot pattern data from a horizontal sync signal and a dot clock signal; and frame rate control means for displaying intermediate gray-scale levels between the R-, G-, and B-base gray-scale data and the R-, G-, and B-next gray-scale data by selectively providing, using a number of the frame rate duty cycle and the dot pattern data, the R-, G-, and B-base gray-scale data and the R-, G-, and B-next gray-scale data on a certain dot of the display screen.

2. A system according to claim 1, wherein said color panel display control means includes means for scanning a scanning frame odd-numbered times.

3. A color panel display control system for a display screen having a plurality of dots, the color panel display control system comprising:

a color panel display device having a predetermined number of gray scale levels for each of specified primary colors;

a CRT controller for outputting display data representing the primary colors and display timing signals to control the color panel display device;

RAMDAC means for converting the display data output from the CRT controller into R-, G-, and B-data; and color panel display controller means having:

means for receiving the R-, G-, and B- data from the RAMDAC means, for generating each of R-, G-, and B-base gray-scale data and each of R-, G-, and B-next gray-scale data from the received R-, G-, and B-data, wherein the R-, G-, and B-base gray-scale data and the R-, G-, and B-next gray-scale data are predetermined by voltage levels associated with the dots of the display screen, and for generating a frame rate duty cycle from a vertical sync signal, dot pattern data from a horizontal sync signal and a dot clock signal;

means for dividing a frame into a predetermined number of matrices, one matrix per pixel being constituted by a plurality of dots; and dither means for displaying intermediate gray scale levels between the R-, G-, and B-base gray-scale data and the R-, G-, and B-next gray-scale data by selectively providing., using the dot pattern data, the base gray-scale data and the R-, G-, and B-next gray-scale data on each of dots in accordance with the dot pattern data.

4. A color panel display control system for a display screen having a plurality of dots, the color panel display control system comprising:

a color panel display device having a number of predetermined gray scales for each of specified primary colors;

a CRT controller for outputting display data representing the primary colors and display timing signals to control the color panel display device;

RAMDAC means for converting the display data output from the CRT controller into R-, G-, and B-data; and color panel display controller means having:

means for receiving the R-, G-, and B-data from the RAMDAC means, for generating each of R-, G-, and B-base gray-scale data and each of R-, G-, and B-next gray-scale data from the received R-, G-, and B-data, wherein the R-, G-, and B-base gray-scale data and the R-, G-, and B-next gray-scale data are predetermined by voltage levels associated with the dots of the display screen, and for generating a frame rate duty cycle from a vertical sync signal, dot pattern data from a horizontal sync signal and a dot clock signal;

frame rate control means for displaying intermediate gray-scale levels between the R-, G-, and B-base gray-scale data and the R-, G-, and B-next gray-scale data by selectively providing, using a number of the frame rate duty cycle and the dot pattern data, the R-, G-, and B-base gray-scale data and the R-, G- and B-next gray-scale data on a certain dot of the display screen;

means for dividing a frame into a predetermined number of matrices, one matrix per pixel being constituted by a plurality of dots;

dither means for displaying intermediate gray scale levels between the R-, G-, and B-base gray-scale data and the R-, G- and B-next gray-scale data by selectively providing, using the dot pattern data, the R-, G-, and B-base gray-scale data and the R-, G-, and B-next gray-scale data on each of dots in accordance with the dot pattern data; and means for selecting one of the frame rate control means and the dither means in accordance with a display frame mode.

5. A system according to claim 4, wherein said selecting means includes means for arbitrarily selecting one of the FRC means and the dither means.

6. A system according to claim 4, wherein said selecting means includes means for automatically selecting one of the the FRC means and the dither means in accordance with a display frame mode.

7. A system according to claim 4, wherein said color panel display control means includes means for scanning a scanning frame odd-numbered times.

8. A color panel display control system for a display screen having a plurality of dots, the color panel display control system comprising:

a color panel display device having a predetermined number of gray scale levels for each of specified primary colors;

a CRT controller for outputting display data representing the primary colors and display timing signals to control the color panel display device;

RAMDAC means for converting the display data output from the CRT controller into R-, G-, and B-data of 6 bits each; and color panel display controller means having:

means for receiving the R-, G-, and B-data from the RAMDAC means, for generating each of R-, G-, and B-base grayscale data and each of R-, G-, and B-next gray-scale data from the received R-, G-, and B-data, wherein the R-, G-, and B-base gray-scale data and the R-, G-, and B-next gray-scale data are predetermined by voltage levels associated with the dots of the display screen, and for generating a frame rate duty cycle from a vertical sync signal, dot pattern data from a horizontal sync signal and a dot clock signal;

frame rate control means for displaying intermediate gray-scale levels between the R-, G-, and B-base gray-scale data and the R-, G-, and B-next gray-scale data by selectively providing, using a number of the frame rate duty cycle and the dot pattern data, the R-, G-, and B-base gray-scale data and the R-, G-, and B-next gray-scale data on a certain dot of the display screen;

means for dividing a frame into a predetermined number of matrices, one matrix per pixel being constituted by a plurality of dots;

dither means for displaying intermediate gray scale levels between the R-, G-, and B-base gray-scale data and the R-, G-, and B-next gray-scale data by selectively providing, using the dot pattern data, the R-, G-, and B-base gray-scale data and the R-, G-, and B-next gray-scale data on each of dots in accordance with the dot pattern data;

first generating means for generating first display color data in the predetermined gray scale;

second generating means for generating second display color data using one of the frame rate control means and the dither means; and switching means for performing a switching operation between the first and the second generating means.

9. A system according to claim 8, wherein said switching means includes means for arbitrarily selecting one of said first generating means and said second generating means.

10. A system according to claim 8, wherein said switching means includes means for automatically selecting one of said first generating means and said second generating means in accordance with a display frame mode.

11. A system according to claim 8, wherein said color panel display control means includes means for scanning a scanning frame odd-numbered times.

12. A color panel display control system for a display screen having a plurality of dots, the color panel display control system comprising:

a color panel display device having a predetermined number of gray-scale levels for each of specified primary colors;

a CRT controller for outputting display data representing the primary colors and display timing signals to control the color panel display device;

RAMDAC means for converting the display data output from the CRT controller into R-, G-, and B-data; and color panel display controller means having:

means for receiving the R-, G-, and B- data from the RAMDAC means, for generating each of R-, G-, and B-base gray-scale data and each of R-, G-, and B-next gray-scale data from the received R-, G-, and B-data, wherein the R-, G-, and B-base gray-scale data and the R-, G-, and B-next gray-scale data are predetermined by voltage levels associated with the dots of the display screen, and for generating a frame rate duty cycle from a vertical sync signal, dot pattern data from a horizontal sync signal and a dot clock signal;

frame rate control means for displaying intermediate gray-scale levels between the R-, G-, and B-base gray-scale data and the R-, G-, and B-next gray-scale data by selectively providing, using a number of the frame rate duty cycle and the dot pattern data, the R-, G-, and B-base gray-scale data and the R-, G-, and B-next gray-scale data on a certain dot of the display screen by the frame rate duty cycle;

dividing means for dividing a frame into a predetermined number of matrices, one matrix per pixel being constituted by a plurality of dots; and dither means for displaying intermediate gray scale levels between the R-, G-, and B-base gray-scale data and the R-, G-, and B-next gray-scale data by selectively providing, using the dot pattern data, the R-, G-, and B-base gray-scale data and the R-, G-, and B-next gray-scale data on each of dots in accordance with the dot pattern data.

13. The system according to claim 12, wherein the color panel display control means generates each of the R-, G-, and B- next gray-scale data of the R-, G-, and B-base gray-scale data from substantially the upper bits of the R-, G-, and B-data.

14. The system according to claim 12, further comprising an arithmetic circuit for performing a predetermined calculation on the basis of the upper and lower bits of each of the R-, G-, and B-data to generate each of R-, G-, and B-next gray-scale data of the R-, G-, and B-base gray-scale data and for generating pattern address data in accordance with the predetermined calculation, and for selecting one of the R-, G-, and B-base gray-scale data and the next R-, G-, and B-gray-scale data from the pattern address data and the dot pattern data and a number of the frame rate duty cycle.

15. The system according to claim 12, wherein the color panel display control means further comprises means for automatically selecting one of the FRC means and the dither means in accordance with a display frame mode.

* * * * *

UNITED STATES PATENT AND TRADEMARK OFFICE
CERTIFICATE OF CORRECTION

PATENT NO. : 5,552,800
DATED : September 03, 1996
INVENTOR(S) : Hiroshi UCHIKOGA et al.

It is certified that error appears in the above-indentified patent and that said Letters Patent is hereby corrected as shown below:

Claim 3, column 12, line 24, "providing.," should read --providing,--.

Claim 6, column 13, line 11, before "FRC", delete "the".

Claim 8, column 13, line 31, "grayscale" should read --gray-scale--.

Claim 8, column 13, line 51, "gray scale" should read --gray-scale--.

Claim 13, column 14, line 49, " B- next" should read --B-next--.

Signed and Sealed this

Eleventh Day of February, 1997

Attest:

BRUCE LEHMAN

Attesting Officer     Commissioner of Patents and Trademarks